UNITED STATES PATENT OFFICE.

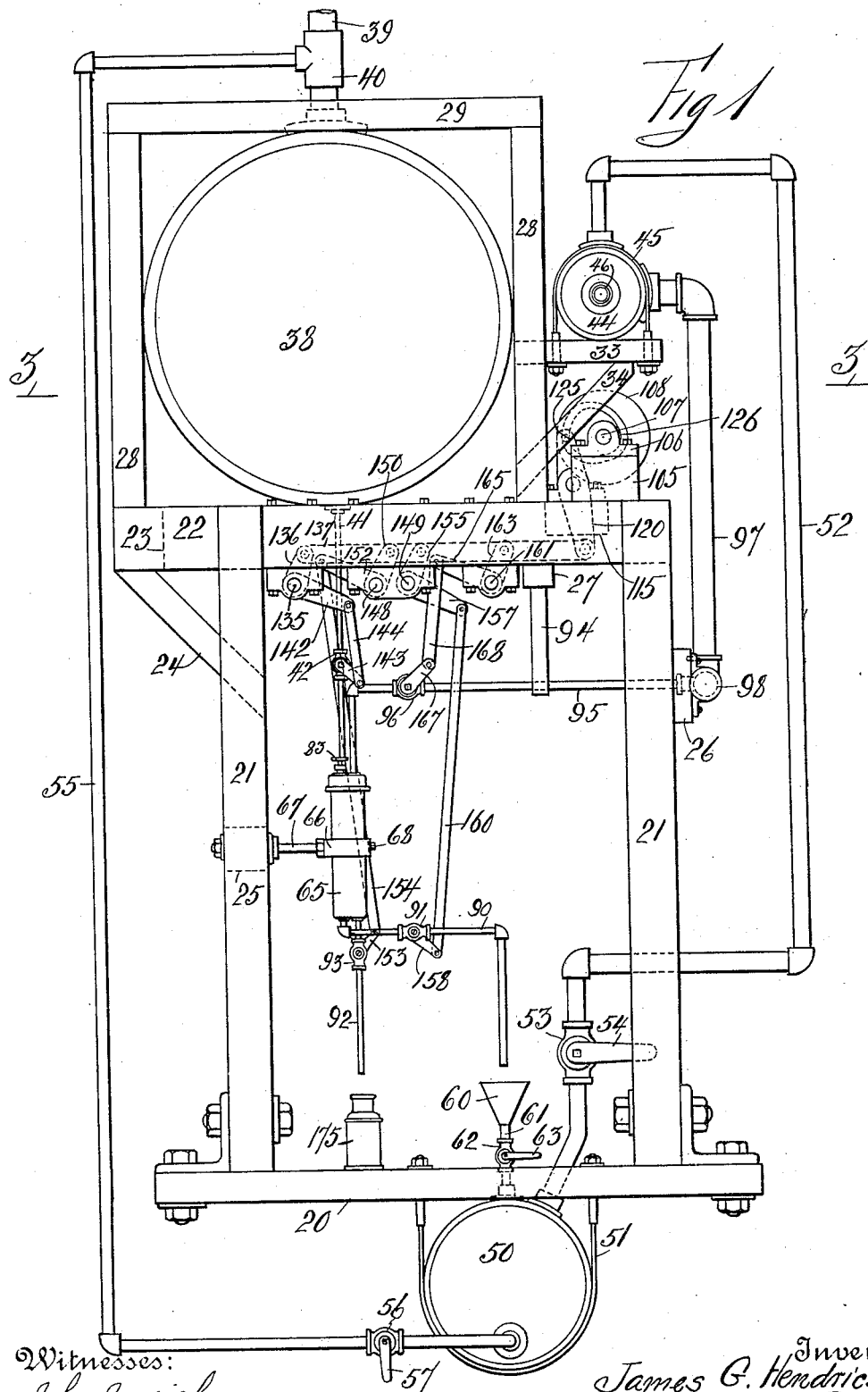

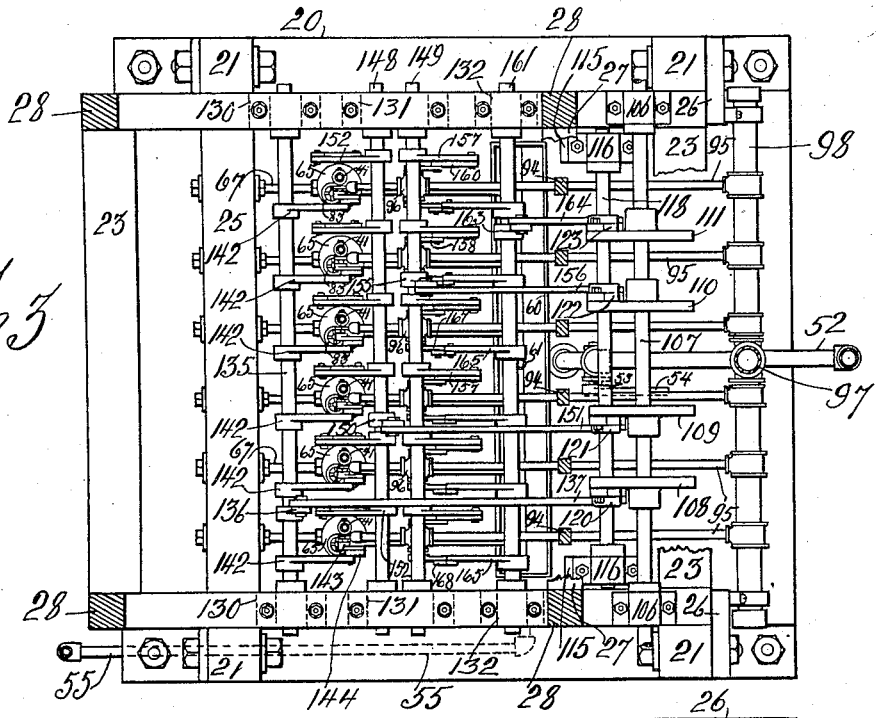
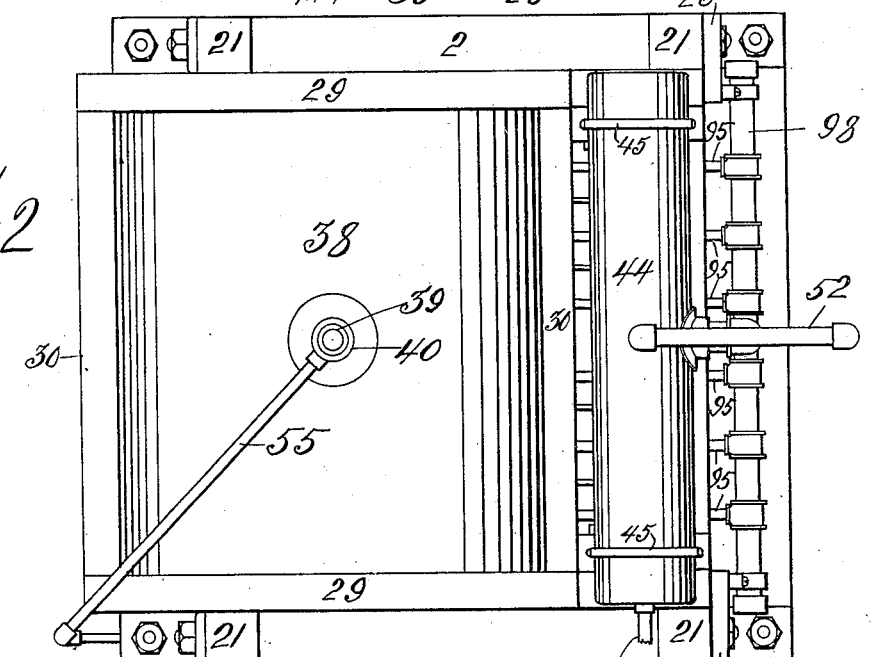

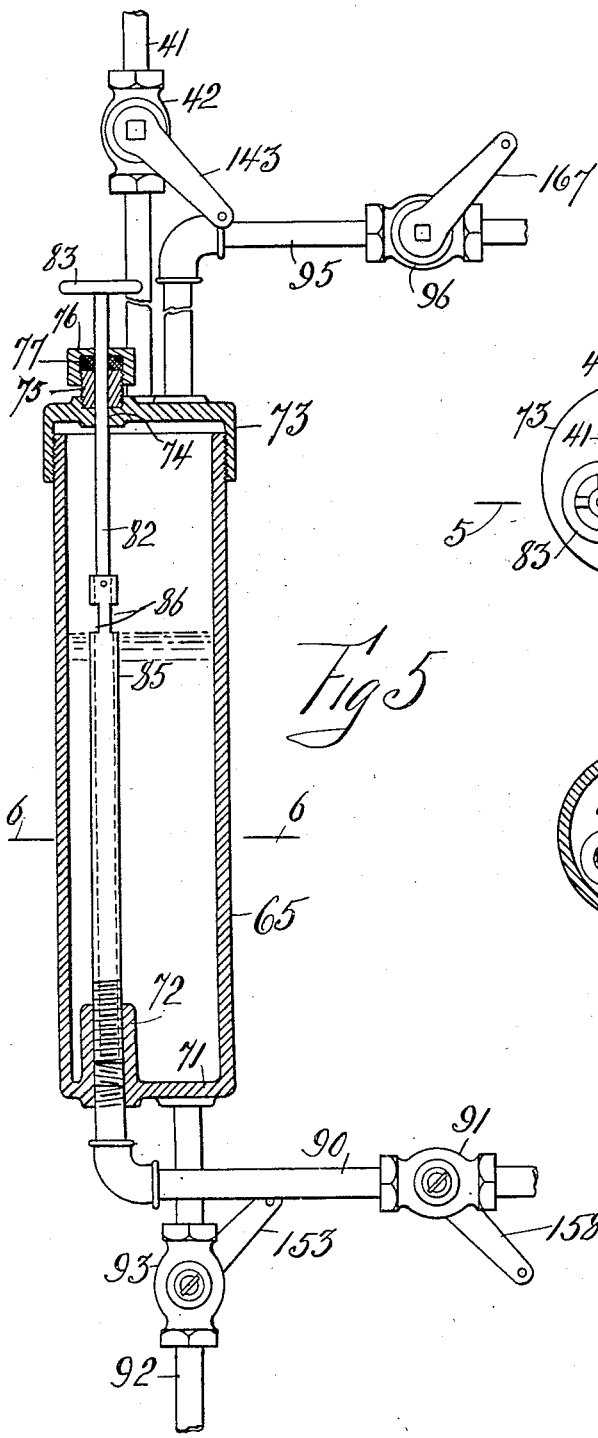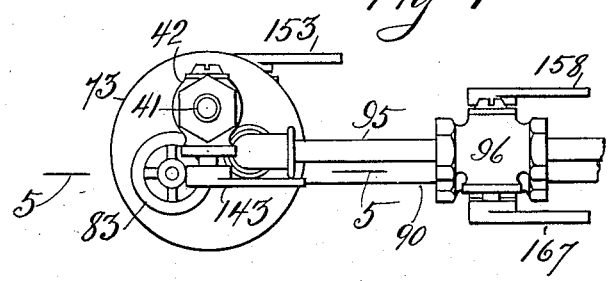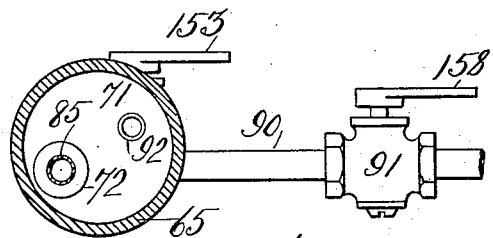

JAMES G. HENDRICKSON, OF BAYONNE, NEW JERSEY, ASSIGNOR OF ONE-HALF TO GILBERT F. HELSON, OF BAYONNE, NEW JERSEY.

MEASURING AND DISPENSING APPARATUS.

1,285,700.

Specification of Letters Patent.   Patented Nov. 26, 1918.

Application filed September 16, 1914.   Serial No. 861,933.

*To all whom it may concern:*

Be it known that I, JAMES G. HENDRICKSON, a citizen of the United States, and a resident of Bayonne, in the county of Hudson and State of New Jersey, have invented certain new and useful Improvements in Measuring and Dispensing Apparatus, of which the following is a specification.

This invention relates to a measuring and dispensing apparatus, and is particularly applicable to measure fluids, liquids or the like. Its principal point of novelty comprises means to accurately measure and deliver to bottles, jars or other containers exact equal quantities of the fluid handled, irrespective of any irregularities or differences of the cubical capacities of said bottles, jars or other containers.

In the drawings Figure 1 represents a side elevation of an apparatus with the invention incorporated therewith; Fig. 2 shows a top plan view of Fig. 1, Fig. 3 is a section in part of Fig. 1 on the line 3, 3; Fig. 4 represents an enlarged top plan view of some details; Fig. 5 shows a section of Fig. 4 on the line 5, 5, and Fig. 6 is a section as on the line 6, 6, of Fig. 5.

In the drawings a table is indicated at 20, upon which are secured the four uprights 21. Horizontal girders 22 are carried by said uprights and girders 23 connect the girders 22. Tie braces 24 connect the uprights 21 and the girders 22. A girder 25 is fastened to a pair of the uprights 21 and blocks 26 are fastened to the uprights 21. A cross girder 27 connects the girders 22, and uprights 28 are supported on the girders 22 and carry the top girders 29. Girders 30 connect the girders 29. Girders 33 have one end each fastened to the uprights 28 and braces 34 connect the girders 33 with the uprights 28. A supply tank 38 is supported on the girders 22. It has connected thereto the inlet pipe 39 with the T 40. Discharge pipes 41 extend from the tank 38 and constitute feed pipes for the measuring vessels to be described. Feed valves 42 are connected to the pipes 41.

An air tank 44 under pressure is supported on the girders 33 and is held in position by the straps 45. An air inlet pipe 46 leads to the tank 44. An overflow tank 50 is located under the table 20 and is held in position by means of the straps 51. Piping 52 with the valve 53 having the operating handle 54, connects the air tank 44 and the overflow tank 50. Piping 55 with the valve 56 having the handle 57 connects the overflow tank 50 with the T 40 of the inlet pipe 39. A trough 60 has extending therefrom a pipe 61, which connects with the overflow tank 50. A valve 62 with the operating handle 63 is connected to the pipe 61.

A plurality of measuring vessels each have a barrel 65. A band 66 encircles each of the said barrels and has in threaded engagement therewith a supporting arm 67, which is secured to the girder 25. A set screw 68 in said band clamps the said barrel in operative position. Each barrel 65 has formed therewith the bottom head 71 with the threaded boss 72.

Each of the barrels 65 is capped with the top cap 73 that has an opening 74. A threaded plug 75 is carried by the cap 73 and has an opening axially in line with the opening 74. A cap 76 is in threaded engagement with said plug, and packing is indicated at 77. An adjusting rod 82 extends through the opening 74 and through the plug 75, cap 76 and packing 77. An adjusting wheel 83 is fastened to the top end of the rod 82. An adjustable overflow pipe 85 with openings 86 in the sides thereof is fastened at its top end to the adjusting rod 82. The lower end of the pipe is threaded and in engagement with the threaded boss 72.

The threaded engagement of the lower end of the pipe 85 with the boss 72, and the adjusting rod 82 with the wheel 83 constitute an adjusting device to locate the pipe 85 at different levels. By means of this device the contents of the fluid in the barrel 65 can be accurately measured. The said device performs its functions within the barrel 65, and it is actuated by the wheel 83 outside of said barrel. The fluid in the barrel 65, is not able to leak through any stuffing box or the like, when the pipe 85, is turned to locate its openings at different levels.

Overflow piping 90 extends from the threaded boss 72 and leads to the trough 60. The latter pipe has connected thereto the valve 91. A discharge pipe 92 with the discharge valve 93 extends from the bottom head 71 of the measuring vessel having the barrel 65. Hangers 94 extend from the girder 27 and support the air inlet pipes 95. The pipes 95 have connected thereto the valves 96 and lead from the barrels 65. A pipe 97 leads from the air tank 44 and connects with the manifold 98. The latter connects with all the pipes 95.

Blocks 105 are supported on the girders 22 and carry the pillow blocks 106 which support the cam shaft 107. The cam shaft has fastened thereto the feed cam 108, discharge cam 109, the overflow cam 110, and the air inlet cam 111.

Blocks 115 extend from the girders 22 and carry the pillow blocks 116. A rock shaft 118 is supported in the pillow blocks 116. Rocker arms 120, 121, 122 and 123 are fastened to the rock shaft 118. The upper ends of each of the rocker arms have rollers 125 journaled thereto, which engage grooves 126 in their accompanying cams 108 to 111. To the lower faces of the girders 22 are fastened the pairs of pillow blocks 130, 131, 132. A feed rock shaft 135 is supported in the pillow blocks 130. An arm 136 is fastened to the shaft 135, and a link 137 connects the arm 136 with the lower end of the rocker arm 120. Arms 142 are fastened to the rock shaft 135.

Arms 143 have each one end fastened to each of the feed valves 42, and a link 144 connects each arm 142 with its accompanying arm 143.

A discharge rock shaft 148, and an overflow rock shaft 149 are journaled in the pillow blocks 131. An arm 150 is fastened to the shaft 148 and a link 151 connects the arm 150 with the lower end of the rocker arm 121. Arms 152 are fastened to the rock shaft 148. Arms 153 have each one end fastened one of the discharge valves 93 and a link 154 connects the outer end of each arm 152 with its coacting arm 153.

An arm 155 has one end connected to the overflow rock shaft 149.

A link 156 connects the swinging end of the arm 155 with the lower end of the rocker arm 122. Arms 157 have each one end fastened to the overflow rock shaft 149. Arms 158 have each one end fastened to one of the overflow valves 91. A link 160 connects the swinging end of each arm 157 with its coacting arm 158.

An air inlet rock shaft 161 is supported in the pillow blocks 132. An arm 163 has one end fastened to the shaft 161. A link 164 connects the swinging end of the arm 163 with the lower end of the rocker arm 123. Arms 165 have each one end fastened to the rock shaft 161. Arms 167 have each one end fastened to the air inlet valve 96. A link 168 connects the swinging end of each arm 165 with its coacting arm 167.

To use the apparatus the supply tank 38 may be considered filled with the fluid or liquid to be measured and dispensed. When the movable parts are located as shown in the drawings the fluid or liquid can enter jars or containers 175 that are located upon the table 20.

The cam shaft 107 is given rotation by means not shown and which transmits rotations to the cams 108, 109, 110, and 111. The rollers of the rocker arms 120, 121, 122 and 123 engaging the grooves of the said cams are thereby swung forward and back. The rocker arm 120 reciprocates the link 137 and thereby the feed rock shaft 135 is oscillated, and through the intervention of the arms 142, links 144 and arms 143, the feed valves 42 are alternately closed and opened to charge the barrels 65 with an excess quantity of material to be charged in each container 175. At the same time the rocker arm 122 transmits oscillating movements to the arm 155, by means of the link 156, and thereby oscillates the overflow rock shaft 149. With the movements of the rock shaft 149 the arms 157 oscillate. Motion is then transmitted to the arms 158, by means of the links 160. The arms 158 alternately open and close the valves 91, which permits the surplus liquid or fluid in the measuring vessel having the barrel 65, to be discharged through the overflow piping 90, and enter the trough 60. The valve 62 being open the surplus fluid or liquid enters the overflow tank 50. The surplus fluid leaves the barrel 65 through the openings 86 in the adjustable overflow pipe 85. The correct quantity of fluid to be charged into the containers is accurately regulated by the level of the lower edges of the openings 86 of the pipe 85. This level is controlled by means of the adjusting wheel 83. If the quantity of the fluid to be charged into the containers 175 is to be increased the wheel 83 is turned to raise the pipe 85, and if it is to be decreased the said wheel is turned to lower said pipe.

With the oscillations of the rocker arm 121, the link 151 is given forward and back movements, which oscillates the arm 150 and with it the rock shaft 148. Thereby through the intervention of arms 152, links 154, and arms 153, the discharge valves 93 are consecutively closed and opened.

The arm 163 is oscillated by means of the oscillations of the rocker arm 123 and the movements of the link 164. Thereby the air inlet rock shaft 161 is oscillated, and through the intervention of the arms 165, links 168 and arms 167, the valves 96 are consecutively opened and closed.

The air inlet pipe 95 receives air under pressure from the air tank 44. Pressure is thus brought upon the fluid or liquid in the barrel 65 and enhances the speed with which the contents thereof can be discharged and enter the containers 175. The surplus fluid in the tank 50 is discharged therefrom and introduced into the supply tank 38, by closing the valve 62, and opening the valves 56 and 53, when said fluid will be forced through the piping 55 into said tank 38.

The invention may be modified by dispensing with the air pressure incident to the air tank 44 and its appurtenances. The user may also remove and eliminate the top cap 73 of the barrel 65, air inlet pipes 95 and the valves 91 with their appurtenances. In the latter instance the fluid enters directly into the barrels 65 through the pipes 41 and is carried away through the discharge pipes 92.

A cycle of operations of the apparatus comprises the following. The valves 42 and 91 are opened simultaneously, with the valves 93 and 96 remaining closed. When an excess quantity of material has been charged into the barrel 65, the valve 42 is closed and the valve 96 is opened, which forces the excess of the fluid or liquid out of the barrel 65 through the overflow pipe 85, piping 90 and valve 91. The exhaust valve 93 is then opened simultaneously with the closure of the valve 91, and the liquid is then discharged from the barrel 65 under pressure.

It will be noted that when heavy liquids are to be charged into the containers, that they are efficiently controlled by means of the air pressure in the barrel 65.

Having described my invention what I desire to secure by Letters Patent and claim is:

1. In an apparatus of the character described the combination of a measuring vessel, a supply tank, a pipe extending between the tank and said vessel, a feed valve in said pipe, an adjustable overflow pipe in the vessel, overflow piping coacting with the overflow pipe, a valve in the latter piping, a trough for the overflow piping, a discharge pipe for the vessel, a valve in the latter pipe, an overflow tank for the trough, a pipe connecting the trough and overflow tank, a valve in the latter pipe, an air tank under pressure, piping connecting the air tank and overflow tank, a valve in the latter piping, piping connecting the overflow tank and supply tank, a valve in the latter piping and means to operate all of said valves.

2. In an apparatus of the character described, the combination of a plurality of measuring vessels, a supply tank, pipes connecting the said tank and each of said measuring vessels, a feed valve in each of the said pipes, an adjustable overflow pipe in each vessel, overflow piping coacting with each overflow pipe, a valve for each of the latter piping, a trough for all the overflow piping, an overflow tank for the trough, a pipe between the trough and overflow tank, a valve in the latter pipe, an air tank under pressure, piping connecting the air tank and overflow tank, a valve in the latter piping, piping connecting the air tank and each of said measuring vessels, valves in the latter piping, piping connecting the overflow tank and the supply tank, a valve in the latter piping, a rotative cam shaft, a cam on said shaft for each one of the valves performing the same functions, that is connected to the piping directly coacting with the measuring vessels.

3. In an apparatus of the character described, the combination of a plurality of measuring vessels, a supply tank, pipes connecting the said tank and each of said measuring vessels, a feed valve in each of said pipes, a feed cam for all the feed valves, connections between the feed cam and its feed valves, an overflow pipe in each vessel, overflow piping coacting with each overflow pipe, a valve for each of the latter piping, an overflow cam for the valves, connections between the overflow cam and its coacting valves, a trough for all the overflow piping, an overflow tank for the trough, a pipe between the trough and overflow tank, a valve in the latter pipe, an air tank under pressure, piping connecting the air tank and overflow tank, a valve in the latter piping, piping connecting the air tank and each of said measuring vessels, a valve for each of the latter piping, an air inlet cam for the latter valves, connections between each of the latter valves and the air inlet cam, a discharge pipe for each vessel, a valve for each of the latter pipes, a discharge cam for the latter valves, connections between the discharge cam and the latter valves, piping connecting the overflow tank and the supply tank and a valve in the latter piping.

Signed at the borough of Manhattan, in the county of New York and State of New York, this 1st day of September, A. D. 1914.

JAMES G. HENDRICKSON.

Witnesses:
A. A. DE BONNEVILLE,
JOHN JESSICH.